S. W. NEWMAYER.
MILK MODIFICATION ROD.
APPLICATION FILED FEB. 6, 1915.
1,199,103. Patented Sept. 26, 1916.
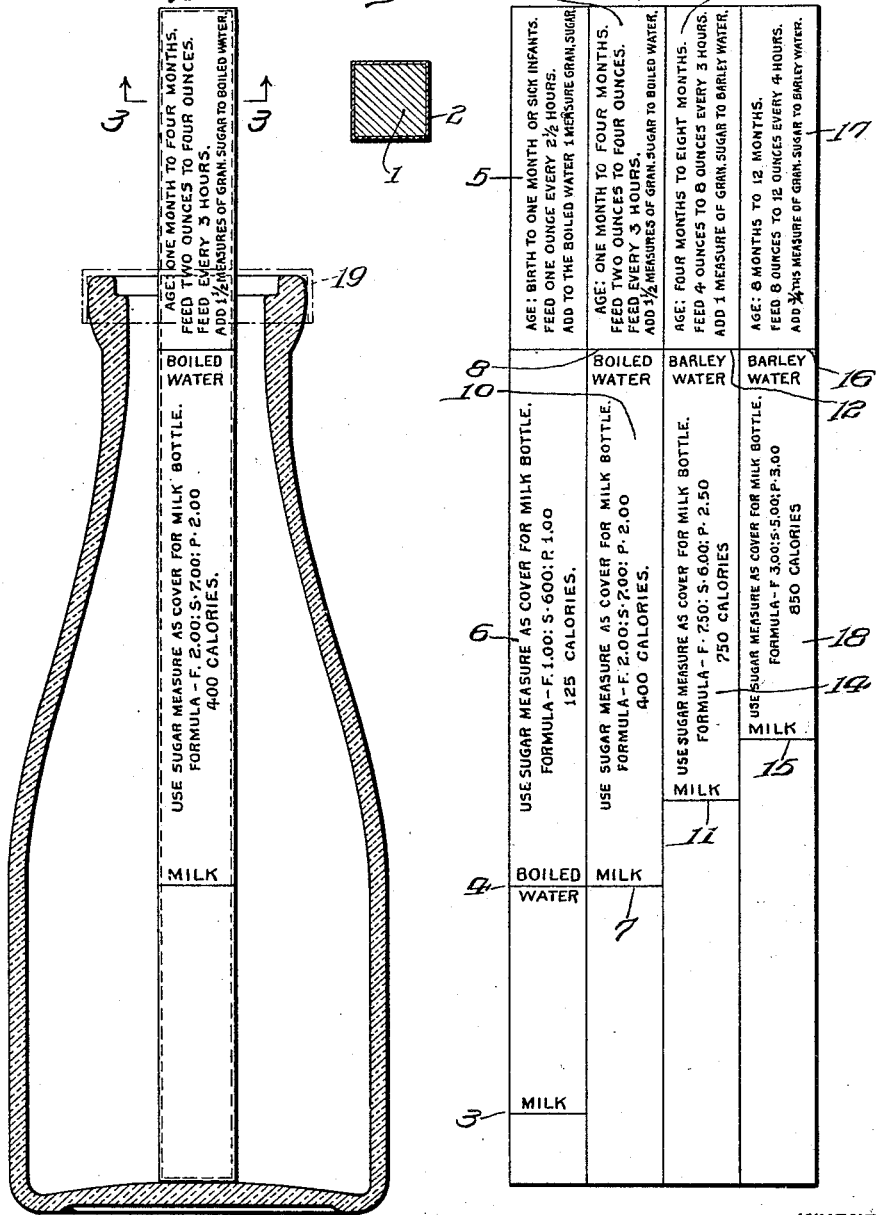
INVENTOR
Solomon W. Newmayer.
WITNESSES
BY
ATTORNEYS

UNITED STATES PATENT OFFICE.

SOLOMON W. NEWMAYER, OF PHILADELPHIA, PENNSYLVANIA.

MILK-MODIFICATION ROD.

1,199,103.  Specification of Letters Patent.  Patented Sept. 26, 1916.

Application filed February 6, 1915. Serial No. 6,424.

*To all whom it may concern:*

Be it known that I, SOLOMON W. NEWMAYER, a citizen of the United States, and a resident of the city of Philadelphia, in the county of Philadelphia and State of Pennsylvania, have invented certain new and useful Improvements in Milk-Modification Rods, of which the following is a full, clear, and exact disclosure.

My invention relates to milk modifying gages and particularly to those gages by means of which food for infants may be properly prepared without the use of a special mixing glass, graduate or particular container other than an ordinary standard milk bottle, such as is found in every home, and such as in which milk, the principal ingredient, is ordinarily delivered.

The objects of my invention are to provide a plain, simple, scientific, practically unbreakable gage on which is plainly indicated or marked the level to which the ingredients in proper order or sequence should be poured into an ordinary standard milk bottle; to provide such a gage as is above referred to with different sets of graduations or markings corresponding to different periods in the age of an infant, said sets of graduations being arranged progressively on adjacent flat surfaces of said gage; to provide a gage which can be used by persons of less than average intelligence to produce a modified food in accordance with the scientific knowledge of the needs of an infant or requirements for an infant's food; to provide a gage of the character described which on account of its low cost of production may be purchased by those who have only the most limited means, or which may be supplied free of cost by physicians or dispensaries without entailing a heavy charge on the donor; to graduate or mark such a gage as is above specified in terms of an ordinary milk bottle,—that is to say, in accordance with the level to which an ordinary standard milk bottle should be filled with the specified ingredients in order to obviate the necessity of purchasing a special receptacle for mixing the ingredients; to avoid the liability of contamination of the milk by making it unnecessary to employ a special vessel or container other than a milk bottle, which, generally speaking, is more liable to be kept cleanly than would a special vessel or container used only for measuring purposes in modifying or preparing an infant's food; to provide a gage of the character described with markings indicated on each side of the surface of the gage in order that a nurse or physician may know the food formula of the resulting modified food prepared in accordance with the directions or markings on the gage for any particular age of the infant.

Further objects of the invention will appear in the specification and claim below.

One embodiment of my invention is illustrated in the drawings forming a part of this specification, in which the same reference characters are employed to designate the same parts throughout the various views and in which—

Figure 1 is a vertical cross-sectional view of a standard milk bottle with my improved gage placed therein for preparing the food; Fig. 2 shows a development of the four adjacent and consecutive surfaces of the gage indicated in Fig. 1; Fig. 3 is a cross-sectional view of the gage taken on the line 3—3 of Fig. 1; and Fig. 4 is a transverse cross-sectional view of a combined closure and measure.

The gage itself comprises a rod 1 of any suitable material polygonal in transverse cross-section to provide a series of flat surfaces extending throughout the length of the gage. Said rod is preferably of wood and is preferably durably coated on all sides and on its ends with a hard surface impervious to hot water, hot milk, or any of the ingredients used in the preparation of the food, as well as to the various substances which might be used in keeping the surface of the gage in a sanitary condition. Such a surface may be provided, for instance, by applying to the stick a coating of white paint and a high grade hard varnish, or a coating of any suitable enamel, to completely incase said stick in a hard surface which is easily kept clean and which will prevent the ingredients from being absorbed by the wood. A white surface is preferable because it renders easy the detection of foreign matter on the gage and provides an excellent surface upon which the graduations may be applied in a manner to be most easily read. Prior to the application of the finishing coat of varnish or other similar material, the graduations and directions may be applied to the coated stick.

As completed the modification rod is provided with a plurality of sets of markings or graduations on adjacent flat faces or flat surfaces of the gage, the markings or graduations on a particular face being those applicable to a certain age or period in the life of the infant. Thus, referring to Fig. 2, on one surface are arranged markings to the level of which the ingredients should be brought in the milk bottle when the gage is inserted in the milk bottle as shown in Fig. 1, in mixing or modifying milk for an infant up to the age of one month, as shown in the first surface on the left of Fig. 2.

In using the gage, the gage should be inserted in the bottle and milk should be poured in up to the graduation marked 3, after which boiled water should be added, containing a measure of granulated sugar, up to the graduation mark 4.

The directions 5 above referred to are provided at the top of the gage and intermediate said directions 5 and the bottom of the gage is provided the formula 6 indicative of the food value of the resulting modified food.

Similarly arranged on the adjacent side or surface of the gage are the graduations for use in connection with the preparation of food for an infant whose age is from one month to four months and for this gage the graduation 7 indicates the height to which the milk should be poured into the bottle, and the graduation 8 indicates the height to which boiled water containing one and one-half measures of granulated sugar should be added in accordance with the directions 9 at the top of said side rule. Intermediate the ends of the gage is printed the food formula 10 for the resulting mixture.

On the next adjacent side of the gage is provided a set of graduations for use in the preparation of food for an infant of from 4 to 8 months of age, the graduation 11 indicating the level to which milk should be poured in the milk bottle and the graduation 12 indicating the level to which barley water containing a measure of granulated sugar should be added. The directions 13 are similarly placed at the top of the gage and the formula 14 is arranged intermediate the ends of the gage.

On the next succeeding side of the scale or gage are graduations for use in the preparation of food for an infant of from 8 to 12 months old, the graduation 15 being the level to which the milk should be brought in the milk bottle; the graduation 16, the level to which an admixture of barley water with three quarters of a measure of granulated sugar should be brought in accordance with the directions 17 at the top of said side and similarly arranged intermediate the ends of the gage on that side is the formula 18 indicative of the food value of the mixture.

From the above it will be seen that I have provided a gage on each side of which are graduations to the level of which the various ingredients are brought in a standard milk bottle when the gage is first inserted in the bottle; a space at the top of the gage in which is arranged mixing and feeding directions proper for the graduations on that side of the gage and also the scientific formula for the resulting mixture for that particular period. In using this gage, it is only necessary to insert the gage in an ordinary standard milk bottle so that the directions should be at the top of the bottle and to pour in first milk to the graduation 3 or 7 or 11 or 15, dependent upon the age of the infant and to then pour into the bottle to the graduation 4 or 8 or 12 or 16 respectively as the case may be, boiled water or barley water, to which has been added the proper amount of sugar pursuant to the directions found at the top of the gage on that particular face thereof.

It is, of course, understood that in providing the graduations on the gage in accordance with the scientific formula stated thereon of the food value of the mixture, the displacement of the gage in the milk bottle has been taken into consideration, as well as in the placing of the markings indicative of the level to which the liquids should be brought in the bottle in preparing a given mixture.

In the directions given at the top of the gage on each surface there is indicated a specified amount of sugar to be added to the boiled water or to the barley water, as the case may be, and to insure the use of the proper amount of sugar, a special measure may be provided, the same being illustrated in section in Fig. 4 and indicated in dotted lines in Fig. 1 from which it will plainly appear that I preferably make this measure of suitable thin material such as paper or blocked tin and of such a diameter that it will readily fit over the top of an ordinary milk bottle, the object being to provide a sanitary closure for the milk bottle when the same is not in use and to provide a convenient gage for measuring the specified amount of sugar. I may, however, dispense with the use of this measure and indicate the amount of sugar to be added in teaspoonfuls or tablespoonfuls whichever is most convenient, without departing from the spirit and scope of this invention.

It is also to be noted that the device obviates any provision thereon for attaching it to the mixing receptacle or any attachments for alining or leveling the device with respect to the receptacle. It is adapted to be inserted into the bottle through the mouth, with the lower end resting directly upon the bottom of the bottle. This enables one to insert the gage into the bottle, lift the bottle to a convenient height while pouring in the ingredients so that the graduations on the scale are substantially on a level with the eye, and are readily seen through the transparent bottle. This makes it easy to pour into the bottle, one after the other, the exact quantity of the several ingredients specified and indicated upon the gage.

Having thus described my invention, what I claim and desire to protect by Letters Patent of the United States is:

A milk modification rod, polygonal in cross section, having an exterior impervious to hot water and providing a plurality of like flat surfaces arranged adjacent to each other around said rod, each extending from the top to the bottom of said rod, said rod being substantially longer than the height of a standard milk bottle, one flat surface thereon being provided with a legend at the top thereof and disposed substantially above the mouth of the bottle, specifying the period in the life of an infant for which said surface should be employed, and provided with a set of graduations indicating the distance from the bottom of said rod to which, in preparing food for an infant of the age designated at the top of said flat surface, the top surface of the contents of a standard milk bottle should be successively brought by placing therein the ingredients specified at said graduations in the order of said graduations when said rod is standing in said bottle, an adjacent flat surface being provided with a similar legend specifying another period in the life of an infant for which such surface should be employed and provided with similar and differently positioned graduations indicating the distance from the bottom of said rod to which said bottle should be similarly filled with ingredients similarly specified on said surface and at said graduations for the period in the life of the infant indicated in said legend at the top of said surface.

In witness whereof, I have hereunto set my hand this fourth day of February, 1915.

SOLOMON W. NEWMAYER.

Witnesses:
 ALSTON B. MOULTON,
 ALEXANDER PARK.

Copies of this patent may be obtained for five cents each, by addressing the "Commissioner of Patents, Washington, D. C."